US006982726B1

(12) United States Patent
Berestov

(10) Patent No.: US 6,982,726 B1
(45) Date of Patent: Jan. 3, 2006

(54) NON-CARTESIAN REPRESENTATION

(75) Inventor: Alexander L. Berestov, San Jose, CA (US)

(73) Assignee: Canon Kabushiki Kaisha, Tokyo (JP)

(*) Notice: Subject to any disclaimer, the term of this patent is extended or adjusted under 35 U.S.C. 154(b) by 1132 days.

(21) Appl. No.: 09/618,200

(22) Filed: Jul. 18, 2000

(51) Int. Cl.
G09G 5/00 (2006.01)
(52) U.S. Cl. .................................. 345/629; 708/442
(58) Field of Classification Search ............... 708/442; 345/629; 701/200; 702/127
See application file for complete search history.

(56) References Cited

U.S. PATENT DOCUMENTS

| 4,807,158 A | * | 2/1989 | Blanton et al. | 345/581 |
| 5,483,567 A | * | 1/1996 | Swerdloff | 378/4 |
| 5,751,275 A | * | 5/1998 | Bullister | 345/167 |
| 5,835,693 A | * | 11/1998 | Lynch et al. | 345/473 |
| 5,986,604 A | * | 11/1999 | Nichols et al. | 342/357.12 |
| 6,064,388 A | * | 5/2000 | Reyzin | 345/418 |
| 6,125,304 A | * | 9/2000 | Suzuki | 700/182 |
| 6,766,343 B1 | * | 7/2004 | Bell et al. | 708/442 |

OTHER PUBLICATIONS

Minutes from 3D DICOM Work Group—WG 17, Diagnostic Imaging an Therapy Systems Division, Feb. 25, 1999.
White paper entitled "3D File Format Example for WG12 and WG17", C. Deforge, Siemens Medical Systems, Inc., Ultrasound Group, May 11, 1999.
White paper entitled "Node-based Approach to N-Dimensional Data Set Representation", D. Sluis, May 17, 1999.
White paper entitled "Requirements of N-Dimensional Data Sets", May 17, 1999 (2 pages).
White paper entitled "Requirements for N-Dimensional Data Sets", B. Hemminger, May 17, 1999 (3 pages).
White paper entitled "Conceptual encoding of N-dimensional data sets", A. Berestov (6 pages).
Minutes from 3D DICOM Work Group—WG 17, Diagnostic Imaging an Therapy Systems Division, May 18-19, 1999.
White paper entitled "Cartesian and Non Cartesian Representation of N-dimensional Data Sets", A. Berestov, Jul. 21, 1999.
Minutes from DICOM WG17 (3D), DICOM Standards Committee, Sep. 16, 1999.
Minutes from 3D DICOM Work Group—WG 17, Diagnostic Imaging an Therapy Syst ms Division, May 8-9, 2000.
White paper entitled "N-dimensional encoding of the projected and refelected data", A. Berestov, Apr. 7, 2000.
Minutes from 3D DICOM Work Group—WG 17, Diagnostic Imaging an Therapy Systems Division, Nov. 29, Dec. 1, 2000.
White paper entitled "N-dimensional representation of topographic data", A. Berestov, Feb. 13, 2001.

(Continued)

*Primary Examiner*—Matthew C. Bella
*Assistant Examiner*—Jon Hadidi
(74) *Attorney, Agent, or Firm*—Fitzpatrick, Cella, Harper & Scinto

(57) ABSTRACT

The present invention provides systems, methods, and computer readable media for manipulating and formatting data sets (e.g., 105, 106) described using different coordinate systems. One version of the invention provides a method for formatting data sets described using different coordinate systems into a single format (136). The method includes the steps of a) acquiring (310) a first coordinate system data set, b) formatting (320) the first coordinate system data set into non-Cartesian representation (NCR) format (136), and c) storing (330) the resulting formatted data sets in NCR format. The method can further include the step of acquiring a second coordinate system data set and formatting the second coordinate system data set in NCR format.

20 Claims, 9 Drawing Sheets

OTHER PUBLICATIONS

Minutes from 3D DICOM Work Group—WG 17, Mar. 2, 2001.

"*HDF Information, Support, and Software from the Hierarchical Data Format (HDF) Group of NCSA*", The National Center for Supercomputing Applications, University of Illinois at Urbana-Champaign, Illinois, last modified Apr. 19, 2000, downloaded from http://hdf.ncsa.uiuc.edu on May 11, 2000.

* cited by examiner

File Header

| 1st Byte (file identifier) | 2nd Byte (file identifier and/or format identifier) | 3rd Byte (format identifier) | 4th Byte (format identifier) | 5th Byte (data type identifier) | 6th Byte (number of dimensions identifier) |
|---|---|---|---|---|---|

FIG. 10

NON-CARTESIAN REPRESENTATION

TECHNICAL FIELD

This invention pertains to the field of data manipulation and formatting, and more particularly, the manipulation and formatting of data sets described using different coordinate systems.

BACKGROUND ART

Non-Cartesian data sets in n-dimensional space occur for various reasons. Those analyzing data often obtain non-Cartesian data in order to simplify their analysis of the data. In addition, for a variety of reasons, engineers design certain acquisition devices to acquire data in non-Cartesian representation. For example, ultrasound detection equipment acquires raw data in polar coordinates. The raw data is then interpolated onto a regular two-dimensional grid.

Another example of non-Cartesian data is a data set acquired along a specified curve in n-dimensional space. In the context of medical imaging, a specified curve can represent a patient's spine. An acquisition device can acquire data, e.g., regularly spaced data, along the specified curve. However, the curve itself is not a Cartesian axis.

When a data analyst wants to analyze or process data sets described using different coordinate systems, the analyst will often laboriously translate each data set into a single coordinate system representation. Thus, there exists a need for appropriate storage formats for data sets described using different coordinate systems. In addition, there exists a need for storage formats that facilitate transformation of stored data sets between Cartesian and non-Cartesian coordinates. There also exists a need for methods and systems that facilitate the fusion or combination of non-Cartesian and Cartesian data sets, particularly when these data sets occupy the same or nearby areas or volumes in n-dimensional space.

DISCLOSURE OF INVENTION

The present invention relates to systems, methods, and computer-readable media for manipulating and formatting data sets (e.g., 105, 106) described using different coordinate systems. One version of the invention provides a method for formatting data sets described using different coordinate systems into a single format (136). The method includes the steps of a) acquiring (310) a first coordinate system data set, b) formatting (320) the first coordinate system data set into non-Cartesian representation (NCR) format (136), and c) storing (330) the resulting formatted data sets in NCR format. The method can further include the step of acquiring a second coordinate system data set and formatting the second coordinate system data set in NCR format.

Another version of the invention provides a computer system (120) for formatting data sets (e.g., 105, 106) described using different coordinate systems into a single format (136). The computer system (120) includes a central processing unit (CPU) (210), and a memory unit (220) coupled to the CPU (210) via data bus (250). The memory unit (220) includes a) a data acquisition module (312) for acquiring a first coordinate system data set, b) a formatting module (302) in communication with the data acquisition module (312) and configured to format the first coordinate system data set into NCR format; and c) a storage module (332) in communication with the formatting module (302) and configured to store the NCR formatted data.

Yet another version of the invention provides a computer-readable medium containing a computer program for formatting data sets (e.g., 105, 106) described using different coordinate systems into a single format (136). The computer program includes a) a data acquisition module (312) for acquiring a first coordinate system data set, b) a formatting module (302) in communication with the data acquisition module (312) and configured to format the first coordinate system data set into NCR format, and c) a storage module (332) in communication with the formatting module (302) and configured to store the formatted data sets in NCR format.

BRIEF DESCRIPTION OF THE DRAWINGS

These and other more detailed and specific objects and features of the present invention are more fully disclosed in the following specification, reference being had to the accompanying drawings, in which:

FIG. 10 is an illustration of one embodiment of a file header structure for the file format of FIG. 5.

DETAILED DESCRIPTION OF THE PREFERRED EMBODIMENTS

Figure 1:
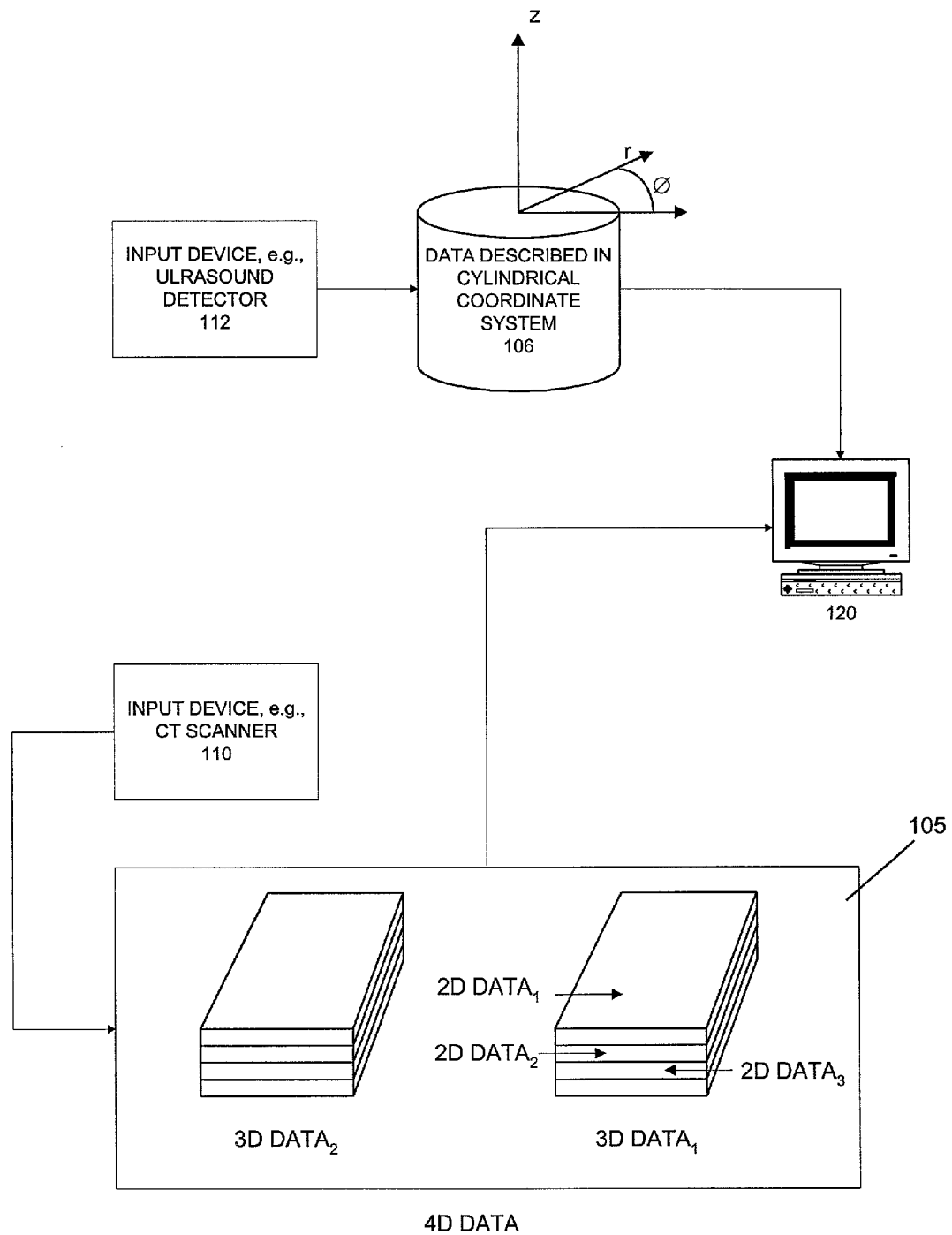
FIG. 1 is an illustration of a system for formatting data sets described using different coordinate systems into a single format.

The present invention relates to the manipulation and formatting of data sets described using different coordinate systems. With reference to FIG. 1, a computer system 120, according to one embodiment of the present invention, can manipulate and format, for example, Cartesian data 105 from a CT (computerized tomography) or MR (magnetic resonance) detector 110 and cylindrical data 106 from an ultrasound detector 112.

Figure 6:
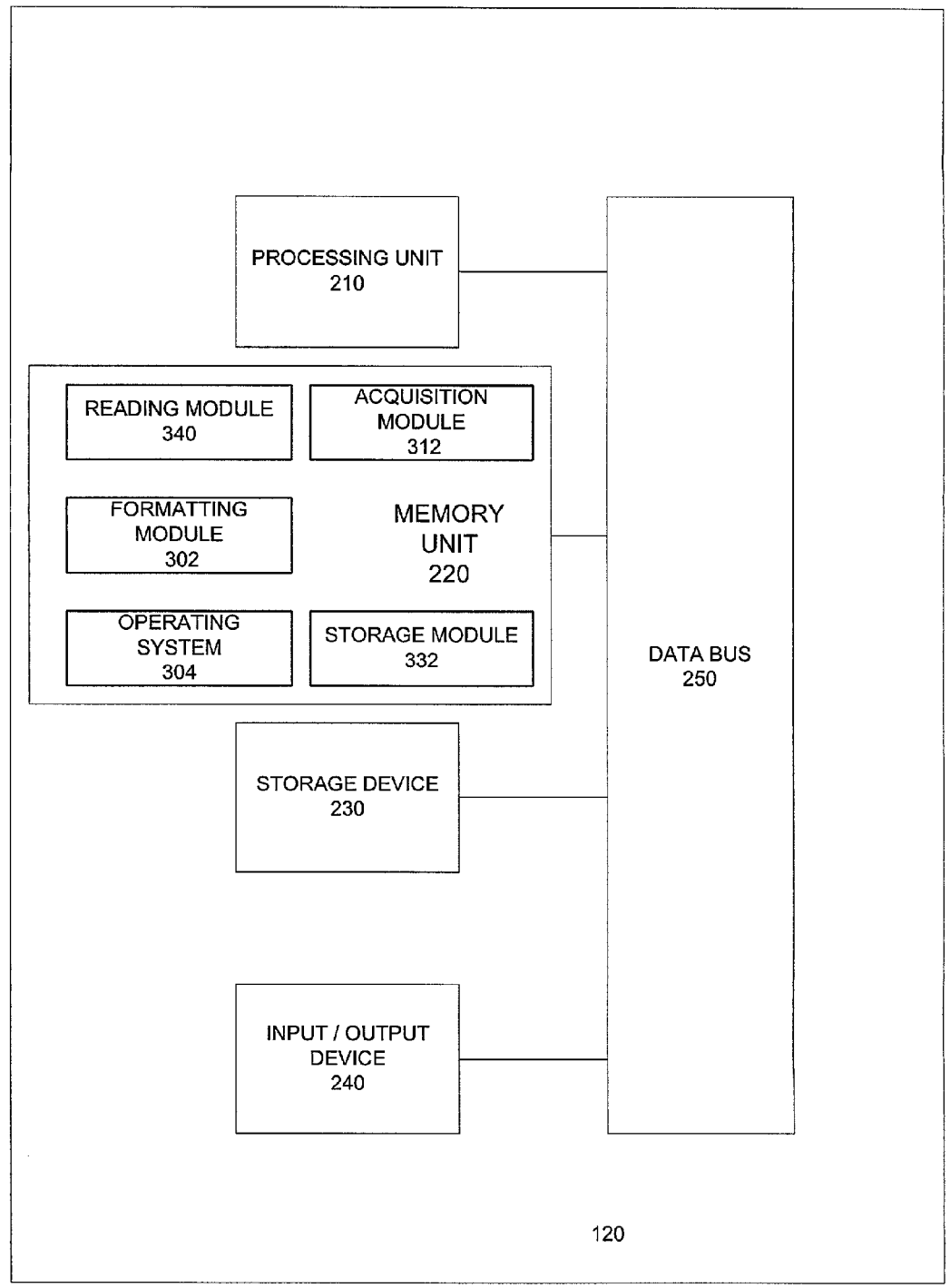
FIG. 6 is a block diagram of one embodiment of the workstation (120) of FIGS. 1 and 3.

With reference to FIG. 6, one embodiment of the computer system 120 includes a central processing unit 210, a memory unit 220, a storage device unit 230, and an input device unit 240, all of which communicate via data bus unit 250. The memory unit 220 can be a dynamic random access memory, a static random access memory, or the like.

The storage device 230 is a conventional storage device, for example, a magnetic disk drive, or a solid-state disk. The input device 240 is a conventional input device connection. The system bus 250 is a conventional system bus, for example, a peripheral module interconnect, or a fire wire. The memory unit 220 includes an operating system 304, a data acquisition module 312, a formatting module 304, and a storage module 332.

Figure 2:
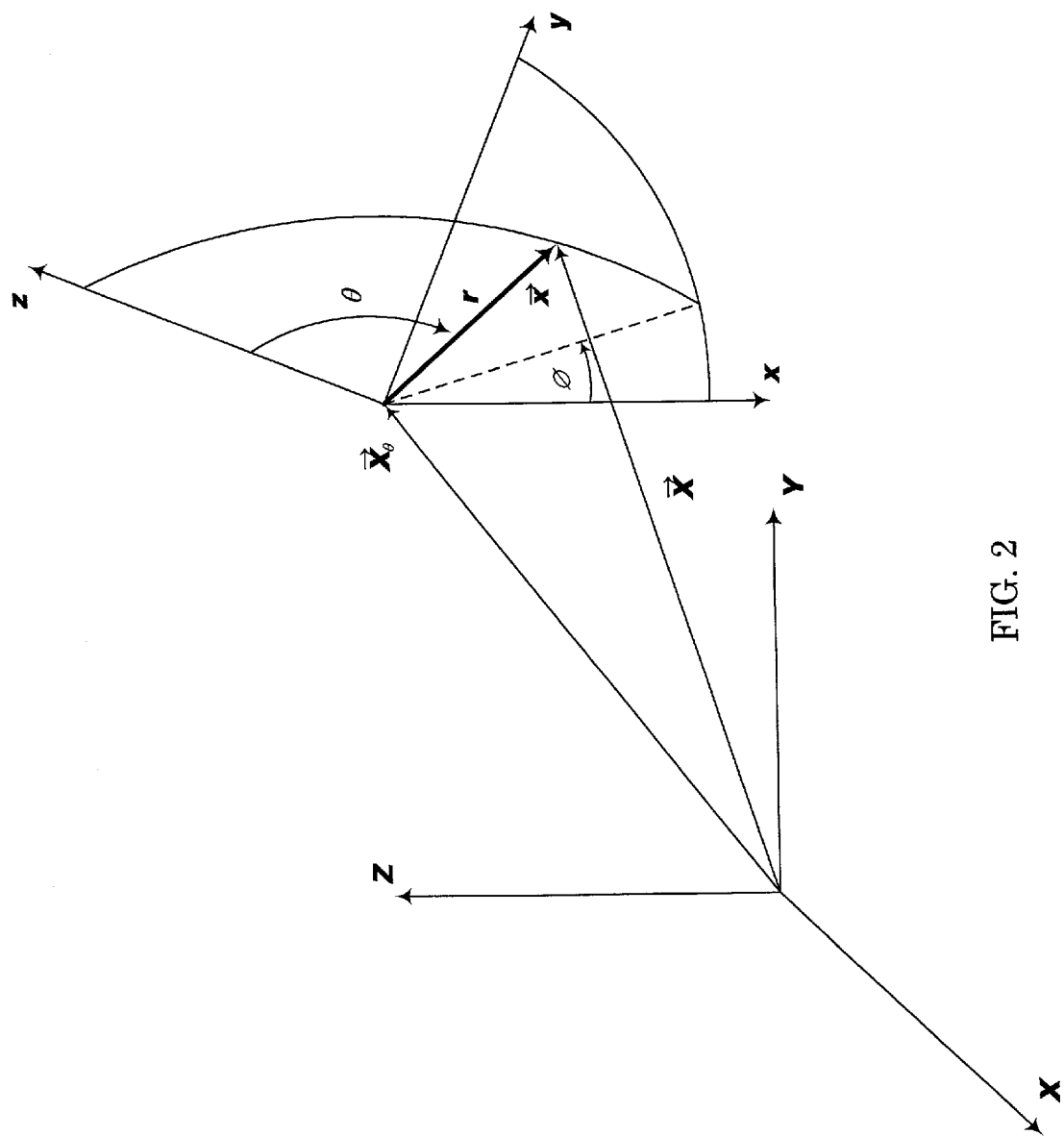
FIG. 2 illustrates the relationship between a global Cartesian coordinate system, a local Cartesian coordinate system, and a local coordinate system used in the systems of FIG. 1.

Programs within the memory unit 220 utilize the relationship between a global (or reference) coordinate system and a local coordinate system to provide a single format for data sets. The data sets can be described using different coordinate systems. FIG. 2 illustrates the relationship between a global (or reference) coordinate system (X, Y Z) and a local coordinate system (x,y,z) or (θ,φ,r). By definition, the global coordinate system is a Cartesian coordinate system. The local coordinate system can be either Cartesian or non-Cartesian depending on the nature of the data. One embodiment of the present invention incorporates a transformation mechanism for relation of local coordinates to a global coordinate system.

When both systems are Cartesian, transformation includes only rotation and translation:

$$X = t_{11}x + t_{12}y + t_{13}z + X_0,$$

$$Y = t_{21}x + t_{22}y + t_{23}z + Y_0, \text{ or } \vec{X} = T\vec{x} + \vec{X}_0.$$

$$Z = t_{31}x + t_{32}y + t_{33}z + Y_0, \quad (1)$$

Here $\vec{X}$ is the position vector in the global coordinate system, $\vec{x}$ is the position vector in the local coordinate system, and $\vec{X}_0$ is the position vector of the local coordinate system origin in the global coordinate system (translation vector). T is the rotation matrix. Its elements are direction cosines of the local coordinate axes in the global coordinate system:

axis Ox has direction cosines $t_{11}$, $t_{21}$, $t_{31}$,
axis Oy has direction cosines $t_{12}$, $t_{22}$, $t_{32}$,
axis Oz has direction cosines $t_{13}$, $t_{23}$, $t_{33}$.

Direction cosines are the cosines of the direction angles with respect to the X-axis, Y-axis, and Z-axis respectively:

$$\sum_{i=1}^{3} t_{ij}^2 = 1, \; j = 1, 2, 3. \quad (2)$$

Equation (2) allows storing just two of the direction cosines and calculating the third one when it is necessary. One embodiment stores the rotation matrix and translation vector together and stores the local data set separately.

When the local coordinate system is non-Cartesian, an embodiment of the present invention utilizes the relationship between the non-Cartesian and the Cartesian coordinate systems. For example, spherical coordinates relate to Cartesian coordinates as follows:

$$x = z_l \sin x_l \cos y_l, \; x_l = \theta,$$

$$y = z_l \sin x_l \sin y_l, \; y_l = \phi,$$

$$z = z_l \cos x_l, \; z_l = r. \quad (3)$$

These Cartesian coordinates can be considered as local Cartesian coordinates, so that for every local coordinate system $(x_l, y_l, z_l)$ there exists a unique local Cartesian coordinate system (x,y,z). One embodiment of a file format according to the present invention stores the rotation matrix and translation vector for making the transformation between the global Cartesian coordinate system and the local Cartesian coordinate system in order to allow transformation between the coordinate systems.

Figure 4:
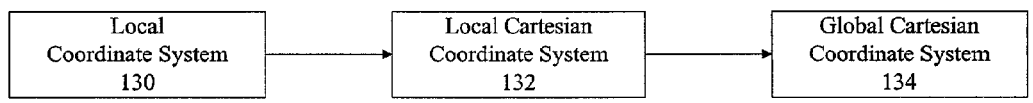
FIG. 4 illustrates three coordinate systems that the systems of FIGS. 1 and 3 incorporate into a format or file structure.
Figure 5:
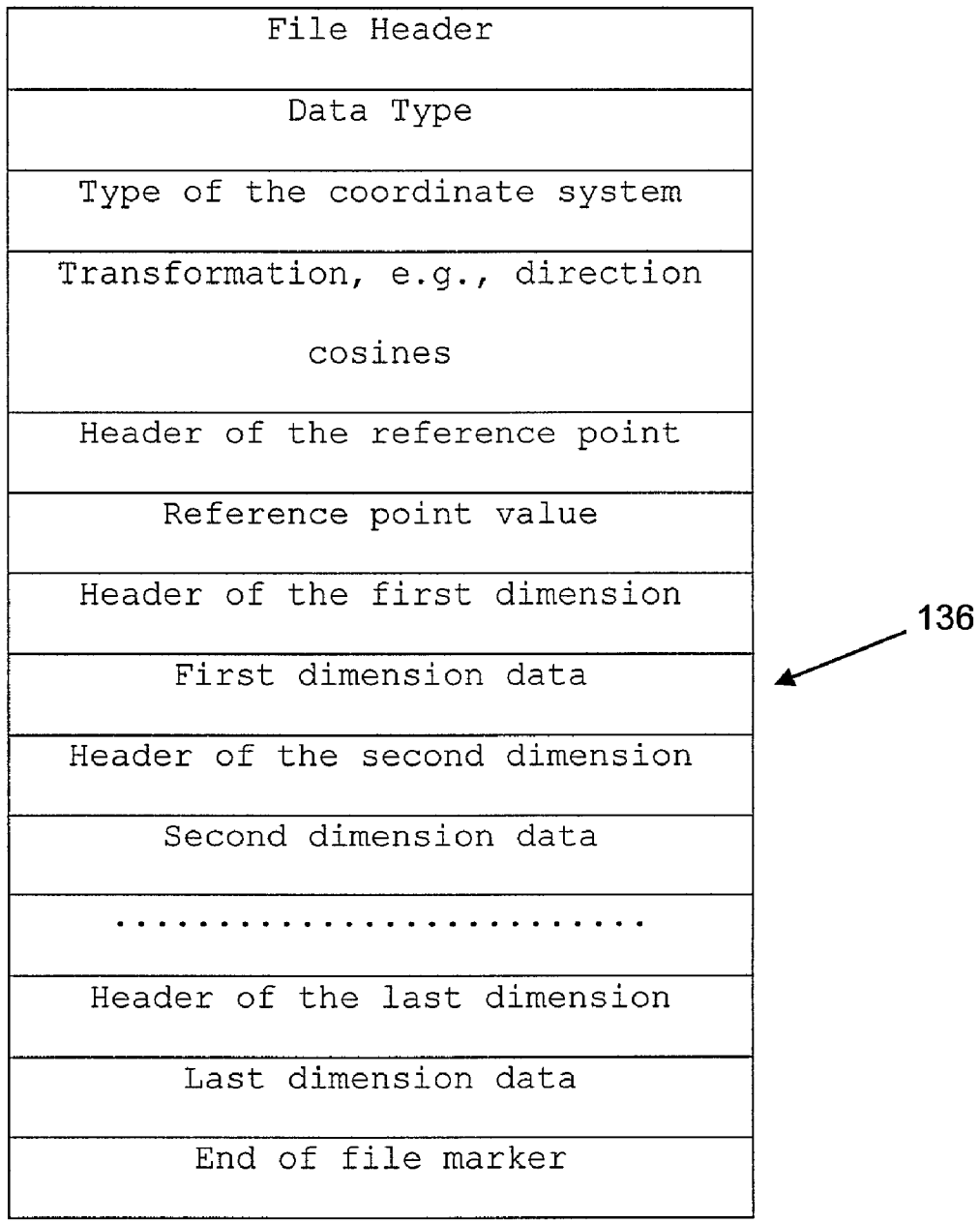
FIG. 5 is an illustrative diagram of one embodiment of the physical format of a data structure for use with the systems of FIGS. 1 and 3.

Thus, with reference to FIGS. 4 and 5, one embodiment of a file structure according to the invention incorporates three coordinate systems into the file structure. The three coordinate systems are the global Cartesian coordinate system 134, the local Cartesian coordinate system 132, and the local coordinate system 130. These coordinate systems are incorporated into the file structure via the type of coordinate system field, the direction cosines field, and the reference point fields.

The local Coordinate system can be either Cartesian or non-Cartesian. When the local coordinate system coincides with the local Cartesian coordinate system, equation (3) becomes:

$$x = x_l,$$

$$y = y_l,$$

$$z = z_l. \quad (4)$$

The local Cartesian coordinate system of one data set can coincide with the local coordinate system of another data set. In this case, a format according to one embodiment of the invention records the relationship between the two coordinate systems. FIG. 1 illustrates a scenario with 2 data volumes coming from different medical devices. The illustrated embodiment relates both data volumes to the global coordinate system X,Y,Z.

FIG. 5 shows one embodiment of the physical format 136 for storing data sets described using either Cartesian or non-Cartesian coordinates systems. The format includes a file header, and a data type field. With reference to FIG. 10, the file header identifies the file as a NCR file and, as described below, includes a format identifier, and a number of dimensions identifier.

The format 136 also includes a type of the coordinate system field. The type of the coordinate system field provides information that allows processing systems to convert between local Cartesian and non-Cartesian coordinate systems.

The format 136 also includes a transformation field, e.g., a direction cosines field, a header of the reference point field, and a reference point value field. The transformation field provides information for transforming between the local Cartesian coordinate system and the global coordinate system. For example, if the transformation field includes a direction cosines field, the direction cosines field provides the direction cosines that make up the rotation matrix of equation (1) above. Similarly, the reference point header and value fields provide information for constructing the translation vector of equation (1). Thus, these fields allow for the transformation of data between the local Cartesian coordinate system and the global coordinate system. As noted above with respect to equation (2), the direction cosines field can include 6 or 9 direction cosines.

The format 136 can locate the type of the coordinate system field and the direction cosine field before or after the reference point section that defines translation. Indeed, the structure of the format can take a number of variations, as will be obvious to those of skill in the art.

With respect to the type of coordinate system field, it is possible to describe nearly any kind of coordinate system type. However, most applications use predefined types that are supported by their compiler.

These coordinate system types can be C-like data types that are generally supported by the hardware of the machine. Several examples of data types are signed character, unsigned character, short, unsigned short, integer, long, float, double, etc.

The length of the type of coordinate system field can be one byte. In this case, 256 different coordinate systems could be predefined.

For every coordinate system type supported by the format, the system defines the relationship of the local coordinates to a local Cartesian coordinate system. A system user can also define a coordinate system type and its associated relationship with a local Cartesian coordinate system.

In order to transform between global and local coordinate systems, the file format contains a rotation matrix, a translation vector, and the coordinate system type. For simplicity, consider 3 dimensions. One can expand this representation to N-dimensional space.

Any axis, e.g., time or patient #, other than a spatial axis, is orthogonal to every other axis and parallel to the same axis in every coordinate system. There is no rotation in a non-spatial axis direction, just translation. Thus, it is possible to use a 3×3 rotation matrix instead of an N×N rotation matrix, and a translation vector with N components for every local data set. Further, it is possible to store a 2×3 rotation matrix instead of a 3×3, and use equation (2) for cosine calculations if necessary.

The direction cosines field contains a maximum of 4 bytes. Thus, if there are nine direction cosines, the fields for the direction cosines make up a 4×9 direction cosines block. The direction cosines of the local Cartesian coordinate system in multidimensional space are defined as real values. It is possible to define a direction cosine as a double or integer.

The data structure in the file allows performing all necessary manipulations with the data using simple "C" coding. As noted above, the order of the blocks in file can be different from the order shown in FIG. 5. For example, the headers of the various dimensions can be grouped together and put in front of the n-dimensional data buffer without separation of the dimensions.

One embodiment of the system stores data acquired in non-Cartesian coordinate systems in a file in its original form without transformation. This allows easy access to the data and facilitates standard layouts, presentations, and operations. This storage format also preserves regular spacing of local data sets as a basic feature of the new format.

Figure 7:
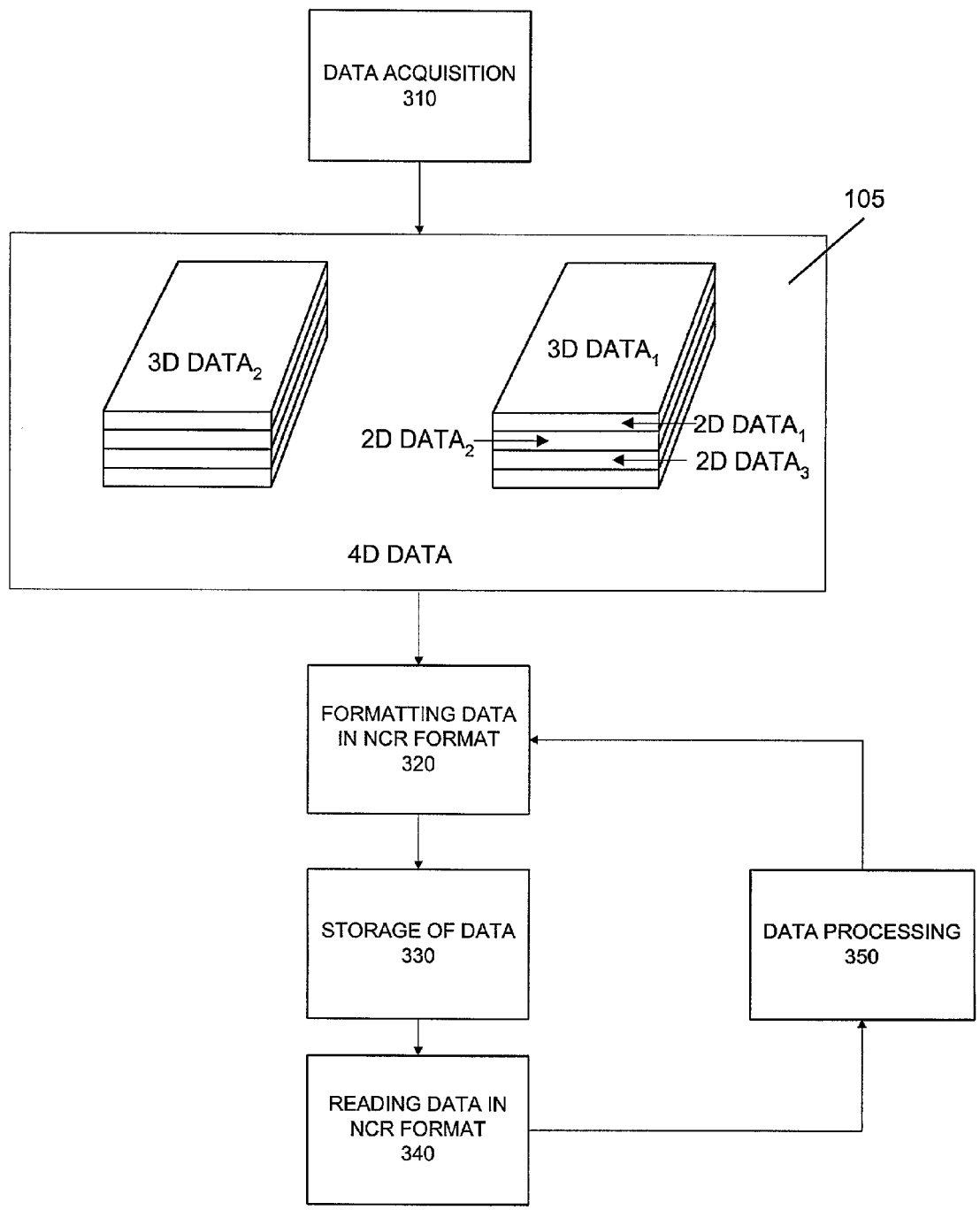
FIG. 7 is a block diagram of one embodiment of a process for manipulating and processing data using the systems of FIGS. 1 and 3.

FIG. 7 is a block diagram illustrating the process of acquiring, formatting, storing, reading, and processing data where the data extends in several dimensions. The data is formatted in a NCR file format. The process illustrated in FIG. 7 begins with the acquisition 310 of a data set, e.g., Cartesian data set 105. The process formats 320 the data in NCR format. The formatted data is then stored 330. The system can efficiently read 340 the stored data and process 350 the data.

Referring to FIG. 6, the data acquisition module 312 is configured to acquire data that extends in a plurality of dimensions. A dimension is defined as any measurable extent, such as length or width. In the present invention, a vector in multidimensional data space describes every new dimension. This vector is defined in three-dimensional Euclidean space, time, sample space, etc. Each regularly or irregularly spaced data set starts with a reference point. Coordinates of this point must be given in some basic coordinate system. Given this structure, the data acquisition module 312 acquires regularly or irregularly spaced data.

The formatting module 302 writes data into NCR format. As a result of the formatting process, the data is transformed into a physical format, which can include a file header, data type, type of the coordinate system, direction cosines, header of the reference point, reference point value, subheaders of each dimension, and multidimensional data extended in a plurality of dimensions. The physical format of the data structure is shown in FIG. 5.

Referring again to FIG. 6, the storage module 332 stores data. After the formatting module 302 formats the multidimensional data in a NCR format, the data, which is currently residing in memory 220, can be stored in a storage device 230, a memory 220, a permanent storage medium, such as a disk, or a tape.

The reading module 340 performs extraction of information from a file using a file header to ascertain the location of subheaders of interest. The file header structure is shown in FIG. 10. The file header consists of a series of blocks. The data storage module 332 stores the type of the data and the number of dimensions in the last two bytes of the file header. The size of every dimension is in the last byte of the corresponding header. In order to find these bytes, the reading module 340 skips over the data and reads the desirable information. Thus, this module can extract information related to the name of the object, its dimensionality, and information about how the data itself is stored on disk.

The reading module 340 also extracts information from subheaders. After the reading module 340 receives information related to the dimensionality of the object, it locates the subheader of the dimension of interest. Each subheader defines the coordinates of a vector in multidimensional space and the number of points along the vector. The data along this vector can be regularly or irregularly spaced.

With reference to FIG. 7, after the system extracts the data from the NCR format, the system processes 350 the extracted data. The system can display the data on a monitor, Video Graphic Array (VGA) or flat panel screen; or it can store the data in a permanent storage medium, such as a disk, or a tape.

Figure 8:
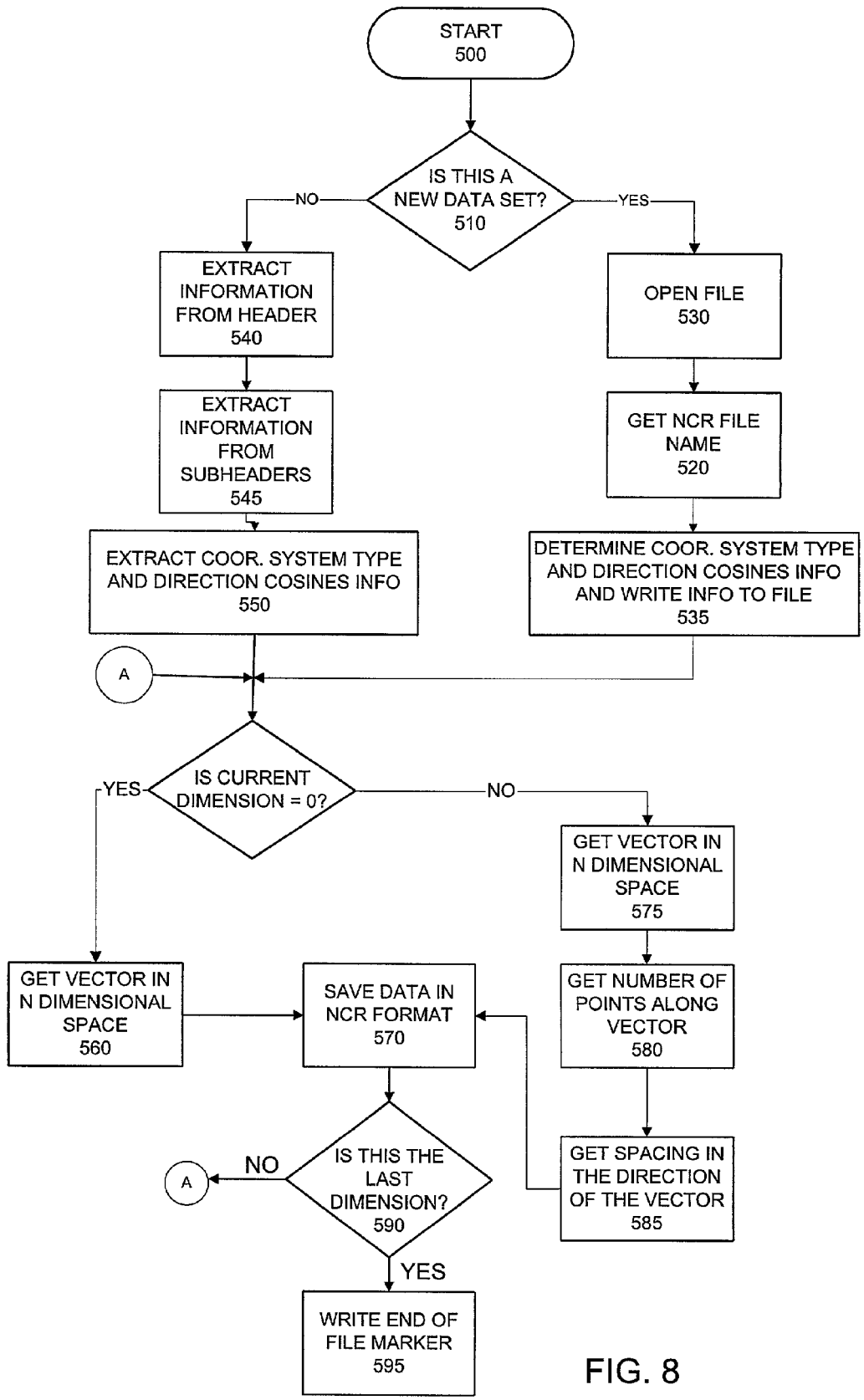
FIG. 8 is a flow chart diagram illustrating one embodiment of a process of saving data in a non-Cartesian representation (NCR) using the systems of FIGS. 1 and 3.

FIG. 8 is a flow chart diagram illustrating one embodiment of a process for storing data in a NCR format in accordance with the present invention. Modules in the memory unit 220 of FIG. 6 perform the process of FIG. 8. The process starts 500 by determining whether acquired data represents a new data set or is additional data for an existing data set 510. If the current data set is a new data set, the process gets opens a file 530 and associates a NCR file name 520 with the new file.

In the alternative, if the data set is additional data for an existing data file, the process extracts information from a file header 540. This information may contain data type, the name of the format, and the number of possible dimensions in the file. A file header structure is shown in FIG. 5. Then, the process extracts information from subheaders 545. The system performs steps 540 and 545 so that the system can add data to an existing file without changing the structure of data previously entered in the file.

Regardless of whether the data set is a new data set or additional data to be added to an existing data set, the process next determines whether the current dimension is zero 555. In other words, the process determines if the portion of the data that is being read refers to a point, i.e., the reference point value and direction. If the current dimension is zero, the process obtains coordinates of a vector in a multidimensional space 560 to indicate the direction of the reference point relative to a global coordinate system.

Each data file starts with a reference point, which represents the starting point of a multidimensional data volume. Coordinates of this point are given in the basic or global coordinate system. That is, when the current dimension is zero, part of the data set corresponding to the zero dimension data consists of one reference point A(0). Finally, the process saves the zero-dimensional data in a NCR format 570. As noted above, data can be stored in a storage device 230, a memory 220, or a permanent storage medium, such as a disk, or a tape.

In contrast, if the current dimension is not zero, the coordinate system of the data set in question has at least one dimension. The process obtains a vector in multidimensional space 575 representing the direction of the dimension in question relative to the preceding dimension, obtains the number of points, N, 580 and obtains spacing in each coordinate, $\Delta X^i$, 585 for regularly spaced data where i represents a dimension number. Finally, the process saves the data in NCR format 570.

The process then determines whether the data represents the last dimension 590. If the data represents the last dimension, the process writes the end of the file marker 595. In the alternative, if the data does not represent the last dimension, the process loops back to 555 to determine whether the current dimension is zero.

Figure 9:
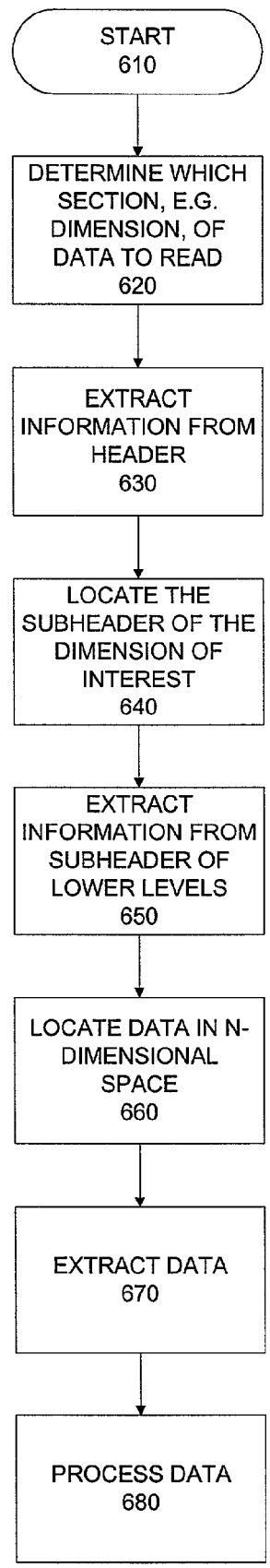
FIG. 9 is a flow chart diagram illustrating one embodiment of a process of reading data in a NCR format using the systems of FIGS. 1 and 3.

FIG. 9 is a flow chart diagram illustrating one embodiment of a process for reading data saved in a NCR format. This process is performed by at least one module in the memory unit 220 of FIG. 6. The process starts 610 by determining which data needs to be read 620. Then, the process extracts information from a file header 630. One embodiment of the file header consists of a series of blocks including a file identifier, a format identifier, a data type identifier, and a number of dimensions field. The type of the data and number of dimensions are stored in the last two bytes of the file header. The size of every dimension is in the last byte of the corresponding header. In order to find these bytes, the file reading process skips over the data and reads the desirable information related to the name of the object, its dimensionality, and information about how the data itself is stored.

Once the process determines the number of dimensions, the process locates the header of the dimension of interest (a subheader) 640 and extracts information from the subheader of a lower dimension 650. Next, the process locates data in multidimensional space 660 described in a particular subheader and extracts the data 670. Finally, after the data has been extracted from the file header and subheader, it is processed 680. Referring to FIG. 1, a system 120 can display the processed data on a monitor, a Video Graphic Array (VGA) or a flat panel screen; and/or it can be stored in a storage device 230, a memory 220, or a permanent storage medium, such as a disk, or a tape.

As noted above, FIG. 5 is a block diagram illustrating the physical format of the data structure in a storage device 230, in a memory 220, or in some permanent storage medium, such as a disk, or a tape. This format includes a header of the file, data type, coordinate system type, direction cosines, header of the reference point, reference point value, headers of each dimensions (referred as subheaders), data in each dimension, and the end of file marker.

The file header contains a constant value that one embodiment of a system according to the present invention can use to quickly identify a file as being a NCR file. The constant value has to be designed to allow easy identification of a NCR file and to allow certain types of data to be recognized. This header both identifies the file as a NCR file and provides for immediate detection of the data type. The first two bytes of the file header identify the file format. Bytes two through four are responsible for naming the format. Byte five can identify the data type that appears in data fields. Byte six shows the number N of possible dimensions in the file.

The header of the reference point comes after the file header. The header of the reference point block contains the coordinates of the reference point in multidimensional space and the number of points along this vector. The number of points is equal to one.

The value of the reference point is defined by the type of the data from the NCR file header. In the case of a real number, the size is equal to 4 bytes. In the case of a double type number, it is equal to 8 bytes.

The header of the first dimension (a first subheader) has a structure that is analogous to the structure of the reference point header. In particular, it defines the coordinates of the first vector in multidimensional vector space. The data along this vector are one-dimensional. The number of the points N(1) could be read from the last four bytes of the header. In order to obtain this information, data can be skipped.

The type of the data from the NCR file header defines the size of every datum in this field. The first datum in the row is located in the previous data block. This means that the row begins with the reference point, and it is not necessary to write it twice.

The header of the second dimension (a second subheader) has an identical structure as the header of the first dimension, except that every new data buffer represents data in a new dimension. In particular, it defines the coordinates of the second vector in multidimensional vector space. The data along this vector are two-dimensional. The number of the points N(2) could be read from the last four bytes of the header. In order to obtain this information, data can be skipped.

Second dimension data are {N(2)−1} rows along the second vector and the data from the previous data blocks compose the first row.

The end of file marker is the relative file address of the first byte past the end of all NCR data. It is used to determine if a file has been accidentally truncated. In addition, it is used as an address where file memory allocation can occur if the information in headers is not used.

Figure 3:
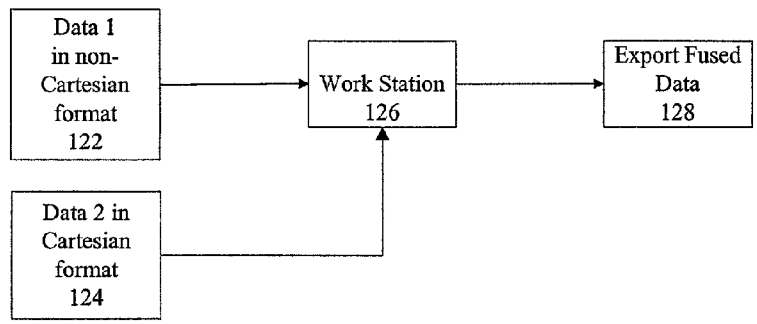
FIG. 3 is an illustration of an alternative embodiment of the system of FIG. 1.

FIG. 3 illustrates a process for receiving a first data set described using a first coordinate system and a second data set using a second coordinate system. According to the illustrated process, a system 126 receives data sets in different coordinate system formats, combines the data sets, and exports the fused data 128. Data 1 represents values in a particular volume. The data is described using a non-Cartesian format. Data 2 represents values in the same volume, or a nearby volume. Data 2 is described using a Cartesian coordinate system. In this example, software on the workstation 126 matches the data sets. The system then calculates a transformation that registers one data set to the other and creates 2 files in n-dimensional format. These two files can then be combined into one file by methods known to those of skill in the art. The workstation can exports the data or store them on local discs.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for storage of data sets, the method comprising the steps of: acquiring a first coordinate system data set; formatting the first coordinate system data set into non-Cartesian representation (NCR) format; and storing the data set formatted into NCR format in a single file format capable of storing at least one other coordinate system data set.

2. The method of claim 1, wherein the acquiring step comprises the step of acquiring a second coordinate system data set, and wherein the formatting step formats the second coordinate system data set into NCR format.

3. The method of claim 1, wherein the first coordinate system data set is described using a non-Cartesian coordinate system.

4. The method of claim 2, wherein the second coordinate system data set is described using a Cartesian coordinate system.

5. The method of claim 1, wherein the single file format comprises:
a file header, and
a header of a reference point relative to a global coordinate system.

6. The method of claim 5, wherein the single file format further comprises:
a transformation field, and
a type of coordinate system filed.

7. Computer apparatus for storage of data sets, the computer apparatus comprising: a central processing unit; and coupled to the CPU, a memory unit comprising: a data acquisition module for acquiring a first coordinate system data set; a formatting module in communication with the data acquisition module and configured to format the first coordinate system data set into NCR format; and a storage module in communication with the formatting module and configured to store the NCR formatted data in a single file format capable of storing at least one other coordinate system data set.

8. The computer apparatus of claim 7, wherein the data acquisition module is adapted for acquiring a second coordinate system data set, and wherein the formatting module is adapted for formatting the second coordinate system data set into NCR format.

9. The computer apparatus of claim 7, wherein the single file format includes a file structure comprising:
a transformation field, and
a type of coordinate system field.

10. The computer apparatus of claim 9, wherein the transformation field is a direction cosines field and the direction cosines field comprises nine direction cosines.

11. The computer apparatus of claim 9, wherein the transformation field is a direction cosines field and the direction cosines field comprises six direction cosines.

12. The computer apparatus of claim 7, wherein the single file format includes a file structure comprising:
a file header, and
a header of a reference point relative to a global coordinate system.

13. The computer apparatus of claim 7, wherein the first coordinate system data set is described using a Cartesian coordinate system.

14. The computer apparatus of claim 8, wherein the second coordinate system data set is described using a Cartesian coordinate system.

15. A computer-readable medium containing a computer program for storage of data sets, the computer program comprising: a data acquisition module for acquiring a first coordinate system data set; a formatting module in communication with the data acquisition module and configured to format the first coordinate system data set into NCR format; and a storage module in communication with the formatting module and configured to store the data formatted into NCR format in a single file format capable of storing at least one other coordinate system data set.

16. The computer readable medium of claim 15, wherein the data acquisition module is adapted to acquire a second coordinate system data set, and wherein the formatting module is adapted to format the second coordinate system data set in NCR format.

17. The computer readable medium of claim 15, wherein the single file format includes a file structure comprising:
a file header, and
a header of a reference point relative to a global coordinate system.

18. The computer readable medium of claim 15, wherein the single file format includes a file structure comprising:
a transformation field, and
a type of coordinate system field.

19. The computer readable medium of claim 15, wherein the first coordinate system data set is described using a non-Cartesian coordinate system.

20. The computer readable medium of claim 16, wherein the second coordinate system data set is described using a Cartesian coordinate system.

* * * * *